(12) United States Patent
Poulakis

(10) Patent No.: US 7,008,589 B1
(45) Date of Patent: Mar. 7, 2006

(54) METHOD AND DEVICE FOR PRODUCING FASTENER PARTS FROM RADIATION CURED PLASTIC MATERIALS

(75) Inventor: Konstantinos Poulakis, Hildrizhausen (DE)

(73) Assignee: Binder Kletten-Haftverschluss-Systeme GmbH, Pulsnitz (DE)

( * ) Notice: Subject to any disclaimer, the term of this patent is extended or adjusted under 35 U.S.C. 154(b) by 0 days.

(21) Appl. No.: 09/913,403

(22) PCT Filed: Jan. 22, 2000

(86) PCT No.: PCT/EP00/00486
§ 371 (c)(1),
(2), (4) Date: Aug. 14, 2001

(87) PCT Pub. No.: WO00/48812
PCT Pub. Date: Aug. 24, 2000

(30) Foreign Application Priority Data
Feb. 15, 1999  (DE) ................................. 199 06 008

(51) Int. Cl.
*B29C 43/22* (2006.01)

(52) U.S. Cl. ...................... 264/470; 264/477; 264/495; 264/496; 264/167; 264/209.6; 264/211

(58) Field of Classification Search ................ 264/470, 264/477, 464, 494, 495, 496, 167, 211, 209.6, 264/331.18, 331.19
See application file for complete search history.

(56) References Cited

U.S. PATENT DOCUMENTS

| | | | | |
|---|---|---|---|---|
| 4,477,405 A | * | 10/1984 | Makhlouf et al. | 264/250 |
| 4,550,060 A | * | 10/1985 | Makhlouf et al. | 428/423.1 |
| 4,794,028 A | * | 12/1988 | Fischer | 428/100 |
| 5,011,642 A | * | 4/1991 | Welygan et al. | 264/167 |
| 5,057,259 A | * | 10/1991 | Parmelee | 264/166 |
| 5,281,371 A | * | 1/1994 | Tamura et al. | 264/1.33 |
| 5,281,373 A | * | 1/1994 | Tamura et al. | 264/1.33 |
| 5,554,333 A | * | 9/1996 | Fujiki | 264/284 |
| 5,785,784 A | * | 7/1998 | Chesley et al. | 156/66 |
| 5,908,680 A | * | 6/1999 | Moren et al. | 428/40.1 |
| 6,451,239 B1 | * | 9/2002 | Wilson | 264/491 |
| 6,482,286 B1 | * | 11/2002 | Harvey et al. | 156/244.27 |
| 6,524,507 B1 | * | 2/2003 | Clune | 264/167 |
| 6,569,374 B1 | * | 5/2003 | Poulakis | 264/447 |
| 6,579,162 B1 | * | 6/2003 | Chesley et al. | 451/538 |

FOREIGN PATENT DOCUMENTS

| | | |
|---|---|---|
| DE | 44 31 622 A1 | 3/1996 |
| DE | 197 05 303 A1 | 1/1998 |
| DE | 196 47 898 A1 | 5/1998 |
| EP | 0 387 904 A2 | 9/1990 |
| WO | WO 98/20767 | 5/1998 |

\* cited by examiner

Primary Examiner—Mark Eashoo
(74) Attorney, Agent, or Firm—Roylance, Abrams, Berdo & Goodman, L.L.P.

(57) ABSTRACT

A process produces cling-fastener parts with a large number of interlocking members (24) from a formulation encompassing radiation-crosslinkable prepolymers. The prepolymer is molded, cast, and/or compression molded into the shape of a large number of interlocking members (24) together with a cling-fastener base (21), and is then radiation-cured. The apparatus producing the cling fasteners encompasses a feed (32, 10) for the formulation (14) of radiation-crosslinkable, in particular acrylic, prepolymers, at least one shaping roll (11) and one backing roll (12). The shaping roll (11) has a large number of radial cutouts (17). A source of UV radiation (19), or an electron-beam source, provides radiation curing of the molded radiation-curable formulation.

21 Claims, 2 Drawing Sheets

METHOD AND DEVICE FOR PRODUCING FASTENER PARTS FROM RADIATION CURED PLASTIC MATERIALS

FIELD OF THE INVENTION

The present invention relates to a process and an apparatus for producing cling-fastener parts which have a large number of interlocking means.

BACKGROUND OF THE INVENTION

Known cling-fastener parts are produced from thermoplastic polyolefins by extrusion. The thermoplastic material, in the plastic or liquid state, is fed, for example, to a gap between a pressure roll and a shaping roll. The shaping roll has a large number of radial cutouts, with both of its ends being open. The thermoplastic material penetrates into the cutouts under the action of the nip pressure, and substantially cures, such that the cling-fastener parts, in the form of a three-dimensional structure, can be released from the shaping roll. The cling-fastener base is molded in the gap between the shaping roll and the pressure roll. The base and the interlocking means, specifically the interlock projections formed in the cutouts and the interlock tips formed, are one single bonded piece.

The materials preferably used in the conventional processes are thermoplastics such as polypropylene, polyamide or polyethylene.

An example of this process is disclosed in WO 98/20767.

High nip pressures of from about 500 N/m to some thousands of N/m are required to achieve adequate supply of the plastic material, in its plastic or liquid state, to the cutouts.

In addition, the relatively low cooling rate of the thermoplastic polymers means that only small meterages of the three-dimensional cling-fastener sheeting can be produced on a shaping roll having a width of about 400 mm.

Production of cling-fastener parts via extrusion of thermoplastics requires a considerable energy cost to heat the thermoplastic composition to temperatures as high as 300° C.

The known processes place production-related restrictions on both the maximum width of the web of cling-fastener sheet and the minimum thickness of the cling-fastener sheet. Velcro Industrie B.V. developed longitudinal and/or transverse stretching processes, described in PCT WO 98/32349, for producing wider, and very thin, film-type cling-fastener sheets. A disadvantage with this process, besides the large amount of high-cost resource used for production, is that each stretching process markedly reduces the number of interlocking means per unit of area.

U.S. Pat. No. 5,787,784 discloses a process for producing cling-fastener parts, by compression molding a thermoplastic material into the shape of a large number of interlocking means. The patent also teaches that the cling-fastener parts may be produced form thermosets.

SUMMARY OF THE INVENTION

An object of the present invention is to provide a process and an apparatus for producing cling-fastener parts, permitting production rates to be increased while reducing energy costs.

Another object of the present invention is to provide a process and an apparatus permitting the production of cling-fastener parts with greater heat resistance, and of film structures with extremely low thickness, while providing a large number of protruding elements or interlocking means.

Very surprisingly, it has been found to be possible to achieve a considerable rise in production rate, while reducing energy costs, by shaping, casting, and/or compression molding a formulation encompassing radiation-crosslinkable, preferably acrylic, prepolymers, and then radiation-curing. It is also possible to dispense with the use of inert atmosphere if the radiation-crosslinkable prepolymers are suitably selected.

Exceptionally high polymerization rates are achieved in the radiation curing of formulations encompassing radiation-crosslinkable, in particular acrylic, prepolymers, where this takes place by way of UV radiation or electron beam. Compared with the known production processes for cling-fastener parts made from thermoplastics, the process of the present invention can provide a ten-fold increase in the rate of rotation of the rolls, and therefore, in the length of the three-dimensional webs produced per unit of time.

Since polymerization by way of radiation crosslinking does not require any heating of the curable composition, as is required in the known processes, the process of the present invention also saves energy.

Another advantage of radiation curing is that the polymerization takes place without releasing cleavage products. Instead, the radiation-crosslinkable prepolymers, in particular acrylic, undergo almost quantitative crosslinking with one another and, where appropriate, also with reactive solvents present.

By using radiation-crosslinkable, in particular acrylic, prepolymers, it is possible to produce heat-resistant cling-fastener parts which can even be used as cling-fastener parts for grinding wheels or other tools, for example. Particularly high heat resistance is possessed by the highly crosslinked acrylic polymers prepared by radiation curing of formulations which encompass bi- and/or trifunctional prepolymers and/or monomers, where these materials promote formation of crosslinking sites. These polymers, which unlike the known polyolefins, polyamides and polyesters, can be used even at temperatures above 300° C., are essentially thermosets.

It is also possible to prepare polymers with predominantly thermoplastic properties via suitable selection of each of the radiation-crosslinkable prepolymers, and, where appropriate, monomers, by increasing the proportion of monofunctional prepolymers and, where appropriate, monomers.

The properties of the polymers are, of course, also dependent on the chain length and the degree of crosslinking of the prepolymers used.

Examples of radiation-crosslinkable, in particular acrylic, prepolymers which may be used are polyester acrylates, epoxy acrylates, polyether acrylates, silicone acrylates, and urethane acrylates.

The use of urethane acrylates is preferred, since these are radiation-crosslinkable without an inert atmosphere. Preferred urethane acrylates are the aliphatic mono-, bi- or trifunctional urethane acrylates, the aliphatic groups contributing to the flexibility of the plastic. It is preferable to use bifunctional aliphatic urethane acrylates. In principle it is also possible to make at least some use of aromatic urethane acrylates of varied functionality. The viscosity of the prepolymers used should preferable be from 3,000 to 60,000 mPa.s.

Other radiation-crosslinkable prepolymers may be used in the formulation. Use of an inert atmosphere and/or an inert gas also permits the use of the following prepolymers:
1. polyester resins or chlorinated polyester resins, or
2. utilizing a cationic crosslinking mechanism
   a) cycloaliphatic epoxy resins, or
   b) epoxy/polyol blends.

When using radiation-crosslinkable, in particular acrylic, prepolymers, the relatively high viscosity mostly requires dilution of the formulation by adding reactive diluents, in particular monomers, to achieve a suitable viscosity. The hardness, degree of crosslinking, flexibility of the polymeric final product, and the viscosity of the starting formulation may be adjusted via suitable selection of the monomers added.

During the polymerization, the monomers are incorporated into the network. There is almost no release of solvents from the polymer.

When using acrylic prepolymers, the monomeric reactive diluents used are preferably acrylates of varied functionality.

Addition of monofunctional acrylates reduces hardness, increases flexibility, and gives the polymer good adhesion properties. Monofunctional monomers also give lower shrinkage during polymerization. In principle, use may be made of any of the known monofunctional acrylates. The monofunctional acrylates are preferably selected from the group consisting of butyl acrylate, 2-ethylhexyl acrylate, hydroxyethyl acrylate, hydroxypropyl acrylate, 4-hydroxybutyl acrylate, ethyl diglycol acrylate, isodecyl acrylate and 2-ethoxyethyl acrylate, particular preference being given to ethoxyethyl acrylate and isodecyl acrylate.

Adding bi- or trifunctional acrylates also adjusts the properties desire, such as hardness and flexibility. Preferred bifunctional monomers used are diethylene glycol diacrylate, dipropylene glycol diacrylate, triethylene glycol diacrylate, tripropylene glycol diacrylate, or 1,6-hexanediol diacrylate, 1,6-hexanediol diacrylate being particularly preferred.

It is also possible, if desired, to use trifunctional acrylates, such as trimethylolpropane triacrylate or pentaerythritol triacrylate, or even acrylates of higher functionality.

It is also possible to use propoxylated monomers, which are less skin-irritant.

It is preferable to use a monomer mixture made from mono- and bifunctional acrylates, in particular a mixture made from 2-ethoxyethyl acrylate and 1,6-hexanediol diacrylate. The concentration of each of the monomers added to the formulation depends on the formulation viscosity required, and on the desired hardness, flexibility and adhesion properties of the polymer, and on the reaction rate, etc.

Another mixture which has proven successful is that made form monomer- and bifunctional acrylates, in particular ethoxyethyl acrylate or isodecyl acrylate, with trimethylolpropane triacrylate.

Another advantage of producing the cling-fastener parts from radiation-crosslinkable prepolymers and monomers is that the adhesion properties of the plastic can be controlled via the selection of the monomers used. It is also possible to achieve sufficient adhesion of the plastic to a desired backing without the additional steps of surface-treatment, by corona discharge, gas flame, or fluorination, required in the case of known thermoplastics. This means that the process of the present invention saves one operation.

To achieve sufficient polymerization using UV-curable formulations, addition of a photoinitiator is required to form the primary free radicals which start the chain reaction on excitation by UV radiation.

In principle, the photoinitiators used may be any of the known molecules which liberate free radicals on absorbing UV. For example, an α-hydroxyketone, α-aminoketones, dimethyl ketals of benzil, bisbenzoylphenylphosphine oxides, metallocenes and derivatives of these can be used.

It is particularly preferable to use a photoinitiator comprising 2-hydroxy-2-methyl-1-phenylpropan-1-one, for example Darocur 1173 from Ciba Geigy.

Other conventional additives, such as dyes, stabilizers, oxygen scavengers, ferrite powder, may, of course, be added to the formulation.

The viscosity of the radiation-crosslinkable formulation depends on the specific conditions of production, for example the nip pressure between the shaping rolls. The viscosity of the formulation should preferably be from 150 to 20,000 mPa.s. Particular preference is given to viscosities from 300 to 5,000 mPa.s.

The percentage of prepolymers added to the radiation-curable formulation depends on the viscosity required from the formulation, on the properties of the prepolymers and monomers, and on the properties of the prepolymers and monomers, and on the properties desired in the plastics material to be produced. The proportion of prepolymers in the formulation is generally from about 60 to 95%, preferably about 80%.

There are varied uses for the cling-fastener parts produced according to the invention. The uses include the babies' diapers or incontinence diapers, heat-resistant cling-fastener parts for securing grinding wheels or of other tools, for securing large areas of carpet, wall hangings, for seat coverings or seating units, packaging, or fly-exclusion mesh, or else for self-cleaning surfaces.

The thickness of the cling-fastener base and the number of interlocking means per $cm^2$ depend on the use of the finished cling-fastener parts.

Besides cling-fastener parts, the process of the present invention can also produce other films which encompass protruding elements or ribs on at least one side, for example riblet films. One side of riblet films has a large number of protruding elements of a type which reduces wind shear loading and/or controls the separation of boundary layers. Depending on the effects desired from the surface structure, the protruding elements may be shaped like shark skin or like a lotus flower, giving a reduction in drag and/or a self-cleaning effect. Surface structures of this type are described by way of example in "Biological Surfaces and their Technological Application—Laboratory and Flight Experiments on Drag Reduction and Separation Control" by D. W. Bechert, M. Bruse, W. Hage and R. Meyer in Fluid Mech. (1997) Vol. 338, pp. 59–87 Cambridge University Press.

Riblet films of this type are likewise produced using the formulations encompassing radiation-crosslinkable, in particular acrylic, prepolymers. These films are similarly molded between a shaping roll and a backing roll as appropriate, and are then radiation-cured. The shaping roll has a large number of cutouts complementary to the riblet structure. The riblet films, which can be produced from radiation-curable formulations, likewise have a high production rate and exceptionally high heat resistance. Examples of uses of the riblet films are for lowering drag on aircraft or railroads, or in pipelines, for preventing icing of aircraft, or as a self-cleaning film.

The invention will now be described using examples.

Radiation-Curable Formulations for Producing Cling-Fastener Parts

A. UV-Curable Formulations
1. 77.7% by weight of Ebecryl 4835[1] from UCB Chemicals, Drogenbos, Belgium
   9.7% by weight of IRR 184[2] (ethoxyethyl acrylate) from UCB Chemicals 9.7% by weight of HDDA[3] (hexanediol diacrylate) from UCB Chemicals 2.9% by weight of Darocur 1173[4] (photoinitiator, 2-hydroxy-2-methyl-1-phenylpropan-1-one) from Ciba Geigy.

The viscosity of this formulation is about 300 mPa.s.

2. 77.7% by weight of Ebecryl 4835[1] from UCB Chemicals 9.7% by weight of TMPTA[5] (trimethylolpropane triacrylate) from UCB Chemicals 2.9% by weight of Darocur 1173[4] from Ciba Geigy, as photoinitiator 3. 9.7% by weight of isodecyl acrylate from UCB Chemicals may also be used in mixing specifications 1 and 2, instead of 9.7% by weight of IRR 184 from UCB Chemicals.

B. Electron-Beam-Curable Formulation 1. 80% by weight of Ebecryl 4835 from UCB Chemicals
10% by weight of IRR 184 from UCB Chemicals
10% by weight of HDDA (hexanediol diacrylate) from UCB Chemicals 2. 10% by weight of isodecyl acrylate are used instead of 10% by weight of IRR 184 from UCB Chemicals, and/or 10% by weight of TMPTA[5] are used instead of 10% by weight of HDDA.

(1) Ebecryl 4835 is stated by the manufacturer to be a mixture of aliphatic urethane diacrylates diluted with 10% of tetraethylene glycol acrylate. The viscosity at 25° C. is about 4,500 mPa.s. The molar mass is about 1,600 g/mol.

(2) IRR 184 is a 2-(2-ethoxyethoxy) ethyl acrylate. The viscosity is stated by the manufacturer to be from about 2.5 to 9 mPa.s at 25° C.

(3) The viscosity of the HDDA is stated by the manufacturer to be 10 mPa.s.

(4) Darocur 1173 is stated by the manufacturer to have overlapping absorption bands in the region from 240 to 400 nm.

(5) The viscosity of the trimethylolpropane triacrylate is stated by the manufacturer to be 115 mPa.s.

Other objects, advantages and salient features of the present invention will become apparent form the following detailed description, which, taken on conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
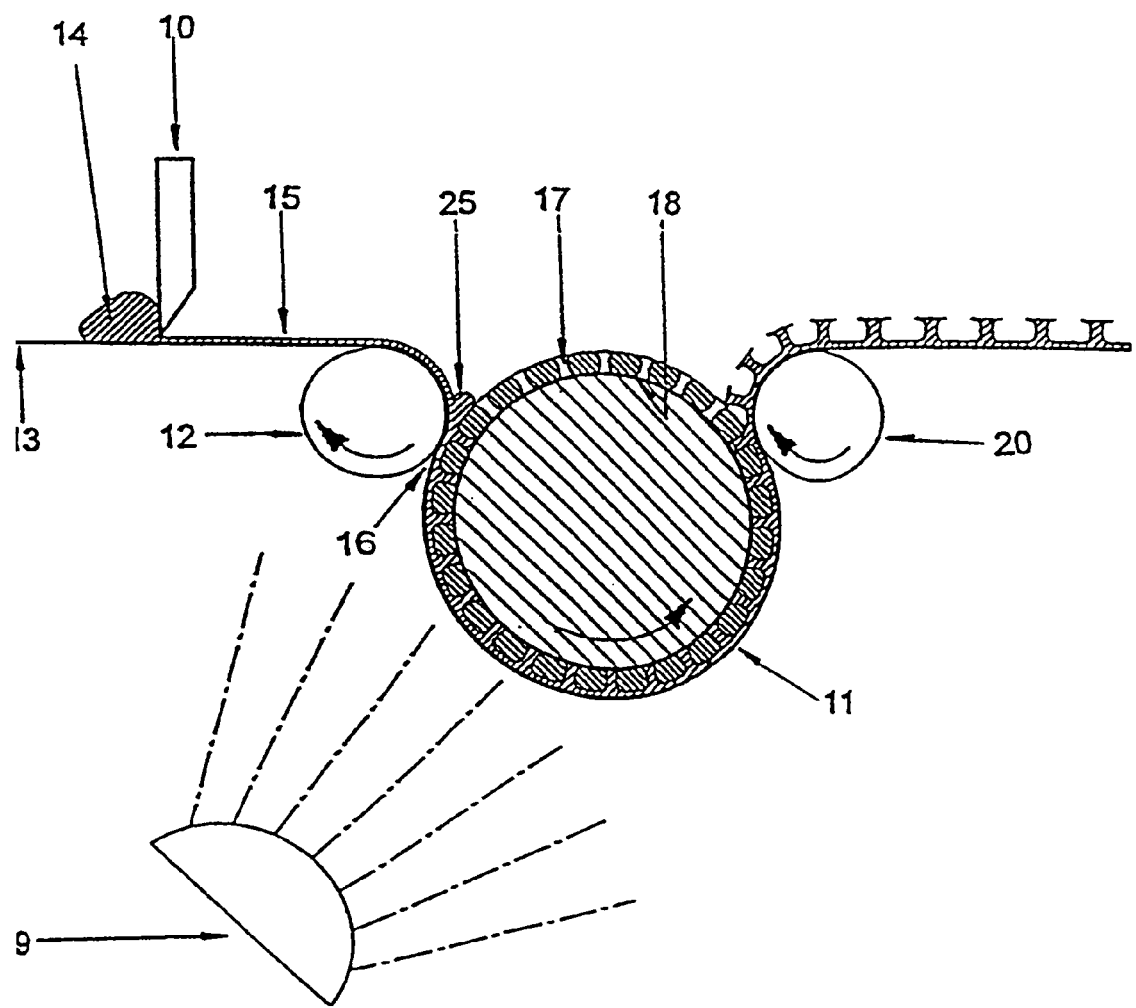
FIG. 1 is a side elevational view in section of an apparatus for producing cling-fastener parts on a backing material by UV curing according to a first embodiment of the present invention.

In the apparatus shown in FIG. 1, the formulation 14 encompassing radiation-crosslinkable, in particular acrylic, prepolymers to be polymerized, as in mixing specification A1, A2 or A3 is applied. The formulation is applied in the form of a film 15 of constant thickness d of from 12 to 50 µm, preferably 22+/−5 µm, to a backing material 13, for example applied by a doctor 10 or by a die.

The backing material 13 used may be a plastics film, e.g. made from Hostaphan, a nonwoven, a textile, or any other suitable backing material.

Figure 3:
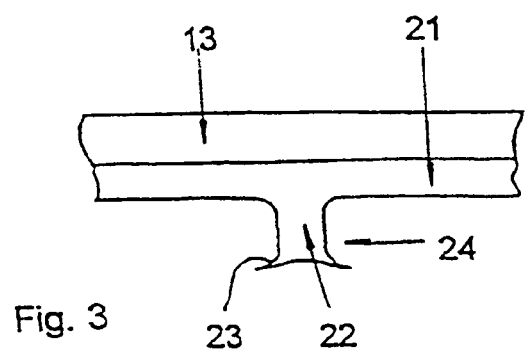
FIG. 3 is an enlarged side elevational view of a cling-fastener part 26 on a backing 13 according to the present invention.

The film 15 made from the formulation to be polymerized on the backing material 13 is then fed to a gap 16 between a shaping roll 11 and a backing roll 12. The shaping roll 11 has a large number of radial cutouts 17, which are open at both ends. The viscous formulation is compressed through the gap 16 into the shape of a cling-fastener base 21, and in the cutouts, into the shape of the interlocking means or member 24 (see also FIG. 3). The interlocking means comprise the interlock prominances 22 and interlock tips 23. Then, the interlocking means is irradiated by UV light 19 of suitable wavelength. The interlocking means may have various shapes, for example a cross section which is round, triangular, rectangular, pentagonal or hexagonal. The interlock tips 23 may also have a variety of shapes, and may be plate-shaped, mushroom-shaped, arched or hook-shaped, for example. Corresponding embodiments are described in DE 198 28 856.5, which is a subsequent publication.

Absorption of the UV light causes the UV-sensitive photoinitiator to liberate free radicals which initiate the free-radical chain polymerization.

The rate of the polymerization reaction is exceptionally high. In a fraction of the conventional full curing time, the cling-fastener parts, composed of the cling-fastener base 21 and of the interlocking means 24 on the backing material 13, can be released form the shaping roll 11 by the take-off roll 20. From about 20 to 30 m of cling-fastener sheeting can be produced per minute. Since the nip pressures required are lower than in the known processes, the apparatus can have wider rolls 11, 12, 20 without any change in precision.

The nip pressure between the rolls 11 and 12 and the UV irradiation also achieves a firm bond between the backing material 13 and the cling-fastener base 21.

In order that the cutouts 17 provided in the shaping roll 11 are completely filled, a slight excess of the formulation is added. The bank 25 of radiation-curable composition 14 provided by this excess always has enough starting material available to supply the cutouts 17 in the shaping roll 11.

The direction of turn or rotation of the backing roll 12 and of the take-off roll 20 is opposite to that of the shaping roll 11.

The UV source 19 used may be a medium-pressure mercury source. However, it is also possible to use other sources of UV radiation. Depending on the band in which the photoinitiator absorbs with free-radical formation, the wavelength range used for irradiation by UV light is from 180 to 400 nm, corresponding to from about 3 to 6 eV.

The irradiation wavelength depends on the emission spectrum of the source of UV radiation used, and on the band in which the photoinitiator absorbs.

The backing material 13 used should, of course, be substantially resistant to the UV radiation. in addition, although the backing material filters and scatters the UV radiation, it has to be ensured that, within the layer to be cured, there is sufficient formation of the primary, photochemically generated, free radicals which initiate the chain reaction.

Figure 2:
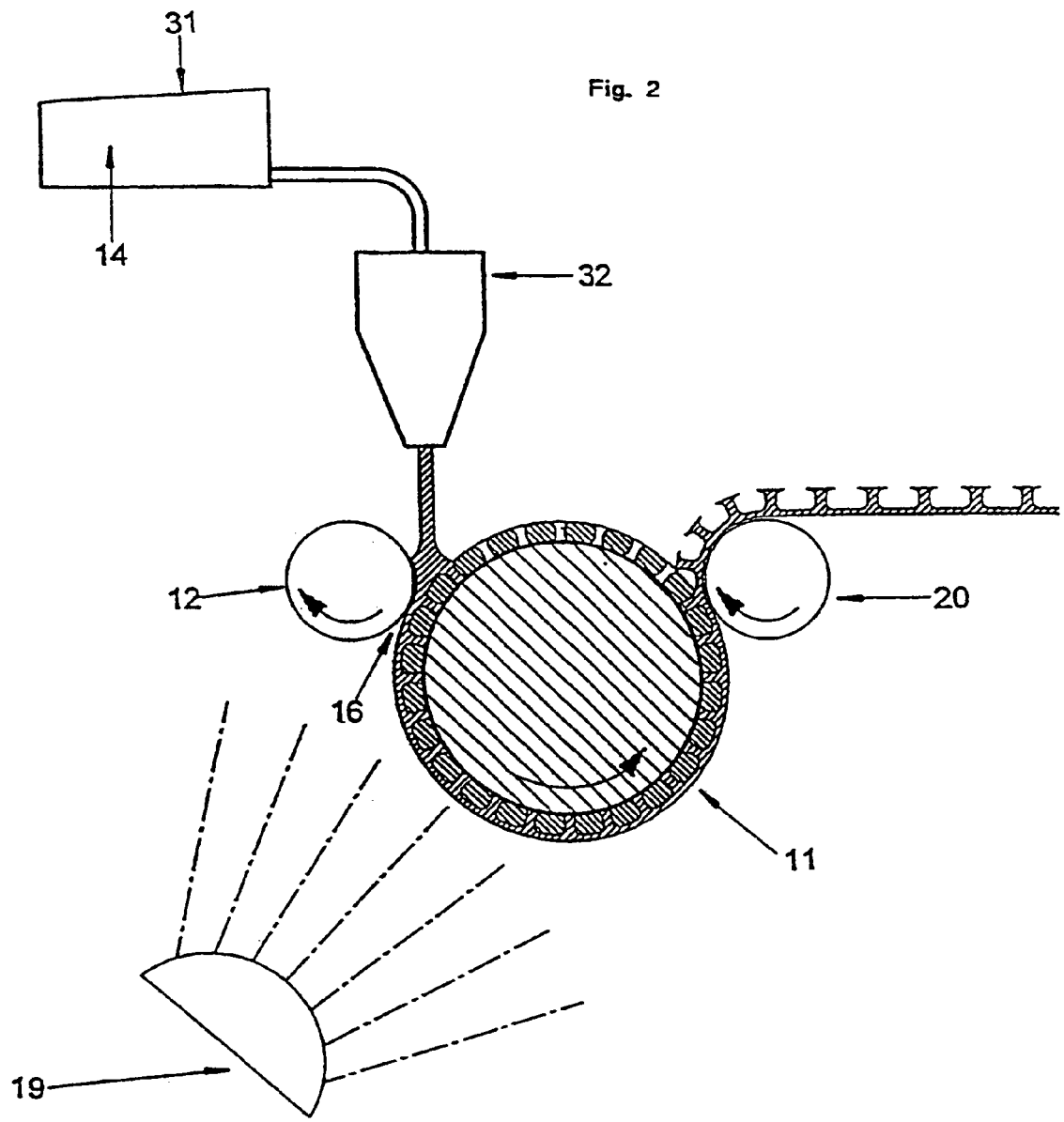
FIG. 2 is a side elevational view in section of the apparatus of FIG. 1 for producing cling-fastener parts with no added backing material by UV curing according to a second embodiment of the present invention.

The apparatus shown in FIG. 2, unlike the apparatus detailed in FIG. 1, produces cling-fastener parts without any added backing material. The radiation-crosslinkable formulation 14 in a storage container 31 is fed via a die 32 to the gap 16 between the shaping roll 11 and the backing roll 12. A small excess of feed, as in the apparatus described in FIG. 1, is provided.

Due to the high viscosity of the radiation-crosslinkable formulation, the shaping of the viscous composition brought about by the pressure applied is retained until the irradiation has caused substantially complete curing. The cling-fastener parts are released form the shaping roll 11 by the take-off roll 20.

If acrylic urethanes are used as prepolymers, there is no need to work in an inert atmosphere. If other radiation-curable prepolymers are used, the reaction should be carried out in an inert atmosphere, in order to prevent premature chain degradation brought about essentially by oxygen.

In an apparatus for producing cling-fastener parts by electron-beam curing, an electron beam source is used instead of the UV source 19 in the apparatuses described in FIGS. 1 and 2. One of the formulations B1 or B2, for example, is then used as radiation-crosslinkable composition.

The energy range of the electron beam is usually from 150 to 300 keV.

The production of the cling-fastener parts from radiation-crosslinkable, in particular acrylic, prepolymers may also take place in other apparatuses operating continuously or batchwise and encompassing means of shaping, casting, and/or compression molding formulations encompassing radiation-crosslinkable, in particular acrylic, prepolymers into the shape of a cling-fastener base with interlocking means arranged thereupon. Such other apparatuses also encompass a source of UV radiation or an electron-beam source for radiation curing.

While various embodiments have been chosen to illustrate the invention, it will be understood by those skilled in the art that various changes and modifications can be made therein without departing from the scope of the invention as defined in the appended claims.

What is claimed is:

1. A process for producing cling fastener parts with a large number of interlocking members, comprising the steps of:
   supplying a formulation of radiation-cross linkable prepolymers to a gap between a shaping roll and a backing roll of a forming station, said formulation having a viscosity of 150 to 20,000 mPa.s at 25° C.;
   compressing the formulation into radial cutouts in the shaping roll in the forming station to form a large number of interlocking members together with a base; and
   treating the interlocking members and base with radiation to cure the formulation thereof.

2. A process according to claim 1 wherein
   said shaping is performed by molding, casting and/or compression molding.

3. A process according to claim 1 wherein
   said prepolymers are acrylic.

4. A process according to claim 1 wherein
   the prepolymers are selected from the group consisting of polyester acrylates, epoxy acrylates, polyether acrylates, silicone acrylates and urethane acrylates.

5. A process according to claim 1 wherein
   the prepolymers are urethane acrylates which are aliphatic mono-, bi- or trifunctional urethane acrylates.

6. A process according to claim 1 wherein
   the formulation encompasses reactive diluents.

7. A process according to claim 6 wherein
   the reactive diluents are monomers.

8. A process according to claim 6 wherein
   the reactive diluents are acrylates.

9. A process according to claim 8 wherein
   the acrylates are monofunctional acrylates selected from the group consisting of butyl acrylate, 2-ethylhexyl acrylate, hydroxyethyl acrylate, hydroxypropyl acrylate, 4-hydroxybutyl acrylate, ethyl diglycol acrylate, isodecyl acrylate and 2-ethoxyethyl acrylate; bifunctional acrylates from the group consisting of diethylene glycol diacrylate, dipropylene glycol diacrylate, triethylene glycol diacrylate, tripropylene glycol diacrylate and 1,6-hexanediol diacrylate; and/or trifunctional acrylates from the group consisting of trimethylolpropane triacrylate and pentaerythritol triacrylate.

10. A process according to claim 9 wherein
    the reactive diluents are 2-ethoxyethyl acrylate, isodecyl acrylate, 1,6-hexanediol diacrylate and trimethylolpropane triacrylate.

11. A process according to claim 1 wherein
    the radiation curing takes place by way of an electron beam.

12. A process according to claim 1 wherein
    the radiation curing takes place by way of UV radiation.

13. A process according to claim 12 wherein
    the formulation comprises at least one photoinitiator.

14. A process according to claim 12 wherein
    the photoinitiator is selected from the group consisting of α-hydroxyketones, α-aminoketones, dimethylketals of benzil, bisbenzoylphenylphosphine oxides, metallocenes, and derivatives thereof.

15. A process according to claim 14 wherein
    the photoinitiator is 2-hydroxy-2-methyl-1-phenylpropan-1-one.

16. A process according to claim 1 wherein
    the viscosity is from 300 to 5,000 mPa.s.

17. A process for producing cling fastener parts having a plurality of interlocking members, said process comprising the steps of:
    supplying a viscous radiation-crosslinkable prepolymer formulation to a backing material; said formulation having a viscosity of 150 to 20,000 mPa.s at 25° C.;
    spreading said viscous formulation into a continuous layer on said backing material;
    feeding said backing material and viscous formulation through a gap between a shaping roll having a plurality of cutouts for forming said interlocking members integral with a continuous base layer on said backing material;
    irradiating said backing material, base layer and interlocking members to cure said prepolymer formulation; and
    removing said interlocking members from said shaping roll.

18. The process of claim 17, further comprising
    supplying an excess of said viscous formulation onto said shaping roll by said backing material, and
    compressing said viscous formulation into said cutouts in said shaping roll by said backing roll.

19. The process of claim 18, wherein
    said viscous formulation is spread on said backing material by a doctor blade.

20. The process of claim 18, wherein said irradiating step comprises
    directing a source of radiation onto said backing material to cure said viscous formulation in a direction from said base layer toward a tip of said interlocking members.

21. The process of claim 17, wherein
    said backing material is a nonwoven fabric or a sheet material.

\* \* \* \* \*